(12) United States Patent
Pan

(10) Patent No.: US 11,509,160 B2
(45) Date of Patent: Nov. 22, 2022

(54) WIRELESS CHARGING DEVICE

(71) Applicant: CHANNEL WELL TECHNOLOGY CO., LTD., Taoyuan (TW)

(72) Inventor: Yi-An Pan, Taoyuan (TW)

(73) Assignee: CHANNEL WELL TECHNOLOGY CO., LTD., Taoyuan (TW)

( * ) Notice: Subject to any disclaimer, the term of this patent is extended or adjusted under 35 U.S.C. 154(b) by 135 days.

(21) Appl. No.: 17/202,669

(22) Filed: Mar. 16, 2021

(65) Prior Publication Data
US 2022/0158472 A1    May 19, 2022

(30) Foreign Application Priority Data

Nov. 18, 2020  (TW) .................. 109140301

(51) Int. Cl.
*H02J 7/02*     (2016.01)
*H02J 7/00*     (2006.01)
*H02J 50/10*    (2016.01)

(52) U.S. Cl.
CPC .............. *H02J 7/02* (2013.01); *H02J 7/0045* (2013.01); *H02J 7/0047* (2013.01); *H02J 50/10* (2016.02)

(58) Field of Classification Search
CPC ...................................................... H02J 7/00
See application file for complete search history.

(56) References Cited

U.S. PATENT DOCUMENTS

2019/0148986 A1* 5/2019 Yoo ......................... H02J 50/12
                                                                      307/104

* cited by examiner

*Primary Examiner* — Robert Grant

(57) ABSTRACT

A wireless charging device is disclosed, and comprises a microcontroller, a wireless charging module, at least one radiator fan, at least one status light, and a temperature sensor. The microcontroller has a memory unit that stores with a plurality of setting parameters, such that the microcontroller controls the wireless charging module to produce a wireless charging signal with a specific power according to the setting parameters, thereby transmitting the wireless charging signal to a receiver coil of a mobile electronic device under wirelessly charged. According to the setting parameters, the microcontroller also carries out a controlling operation of the radiator fan, such as fan rotation starting, rotation speed raising, rotation speed lowering, and fan rotation stopping. In addition, the microcontroller also controls the status light to exhibits a corresponding lighting scenario according to the setting parameters and an immediate charging mode.

19 Claims, 8 Drawing Sheets

WIRELESS CHARGING DEVICE

BACKGROUND OF THE INVENTION

1. Field of the Invention

The present invention relates to the field of wireless charging technologies, and more particularly to a wireless charging device with functionality of charging power and charging speed adjustable.

2. Description of the Prior Art

With the rapid development of mobile communication technologies like 4G and 5G, smartphone has therefore become a necessary article in each person's life. It should be known that, there are many functional systems integrated in a smartphone, including ambient light sensing system, distance sensing system, inertial sensing system, and global positioning system (GPS). Besides above-mentioned functional systems, high-level smartphone is further integrated with at least one biometric characteristics detecting system, such as blood oxygen saturation measuring system, heart rate (HR) measuring system, face recognition system, and fingerprint recognition system.

Nowadays, most of the commercial smartphones have been integrated a wireless charging module for facilitating a user to charge his smartphone. FIG. 1 shows a stereo diagram of a wireless charging device and a smartphone. As FIG. 1 shows, the conventional wireless charging device 1' comprises a wireless charging base 12' and a power adapter 11', such that a smartphone 2' can be put on the wireless charging base 12' for being wirelessly charged. FIG. 2 shows a block diagram of the wireless charging device 1' and the smartphone 2'. FIG. 2 depicts that the wireless charging base 12' principally comprises a microcontroller 121', a power modulating unit 122', and a transmitter coil 123'. Moreover, the wireless charging module of the smartphone 2' consists of a receiver coil 21' and a power management unit 22'. As introduced in more detail below, the wireless charging base 12' further comprises an status light 124' disposed on one side thereof.

During a wireless charging operation of the wireless charging device 1', the power adapter 11' converts an AC mains power to a first DC power, and the transmit the DC power to the wireless charging base 12'. Subsequently, after the transmitter coil 123' is powered by the power modulating unit 122' so as to make the receiver coil 21' produce an induced magnetic field, a wireless power transfer is carried out between the transmitter coil 123' and the receiver coil 21'. Consequently, the power management unit 22' receives a second DC power from the receiver coil 21', and then utilizes the second DC power to charge the battery 23' of the smartphone 2'. In case of the battery 23' being charged by the second DC power, the microcontroller 121' controls the status light 124' to emit a first visible light with a specific color (e.g., blue light). In addition, after the battery 23' is charged to have 100 percent battery power, the power management unit 22' stops charging the battery 23', and microcontroller 121' controls the status light 124' to emit a second visible light with a specific color (e.g., green light). In such case, user is informed by the green light to know his smartphone 2' has completed the battery charging.

However, it is a pity that the conventional wireless charging device 1' exhibits many shortcomings in practical use. The shortcomings are summarized as follows:

(1) because there is no radiator fan integrated in the wireless charging base 12', heat generated during a quick wireless charging operation of the wireless charging base 12' fails to be transferred from the internal of the wireless charging base 12' to the air, thereby influencing the normal working performance of the wireless charging base 12' and/or the smartphone 2'.

(2) The status light 124' can merely exhibit two lighting scenarios for indicating that the battery 23' is in a full charge state or a charged state, and lacks the lighting scenarios for indicating an enabled state and a standby state of the wireless charging base 12'.

(3) The status light 124' further lacks a lighting scenario for indicating a failure of the wireless charging operation of the wireless charging base 12'.

(4) The wireless charging base 12' lacks a functionality of charging speed adjustable, such that the wireless charging base 12' can merely wirelessly charge the smartphone 2' by single constant charging speed.

From above descriptions, it is understood that, there are rooms for improvement in the conventional wireless charging device 1'. In view of that, inventors of the present application have made great efforts to make inventive research and eventually provided a wireless charging device with functionality of charging power and charging speed adjustable.

SUMMARY OF THE INVENTION

The primary objective of the present invention is to disclose a wireless charging device for use in wirelessly charging a mobile electronic device. The wireless charging device comprises a microcontroller, a wireless charging module, at least one radiator fan, at least one status light, and a temperature sensor. The microcontroller has a memory unit that stores with a plurality of setting parameters, such that the microcontroller controls the wireless charging module to produce a wireless charging signal with a specific power according to the setting parameters, thereby transmitting the wireless charging signal to a receiver coil of the mobile electronic device. Moreover, according to the setting parameters, the microcontroller carries out a controlling operation of the radiator fan, such as fan rotation starting, rotation speed raising, rotation speed lowering, and fan rotation stopping. In addition, the microcontroller also controls the status light to exhibits a corresponding lighting scenario according to the setting parameters and an immediate charging mode.

In order to achieve the primary objective of the present invention, inventors of the present invention provides an embodiment for the wireless charging device, which comprises:

a wireless charging base, comprising a base and a cover;
an electrical connector, being disposed in the base, and being exposed out of the base via a through hole that is formed on one side of the base, thereby being further connected to an external electrical cable;
a microcontroller, being disposed in the base and coupled to the electrical connector;
a power modulating unit, being disposed in the base, and being coupled to the electrical connector and the microcontroller;
a transmitter coil, being disposed in the base and coupled to the power modulating unit;
at least one radiator fan, being disposed in the base and coupled to the microcontroller;

at least one status light, being disposed in the base and coupled to the microcontroller, wherein the status light has a light emission portion that is exposed out of the base via a through hole formed on one side of the base; and a temperature sensor, being disposed in the base and coupled to the microcontroller;

wherein the microcontroller has a memory unit that stores with a plurality of setting parameters comprising a fan enabling temperature, a fan disabling temperature, a first reference power, a second reference power, a third reference power, a non-charge charge time period, a high-power charge time period, a regular-power charge time period, a low-power charge time period, and a plurality of lighting scenarios;

wherein in case of the wireless charging device being enabled to wirelessly charge a mobile electronic device in the high-power charge time period, the regular-power charge time period or the low-power charge time period, the microcontroller controlling the power modulating unit to produce a wireless charging signal with a designated power, thereby transmitting the wireless charging signal to a receiver coil of the mobile electronic device through the transmitter coil;

wherein when the wireless charging device is operated in the high-power charge time period, the regular-power charge time period or the low-power charge time period, the microcontroller controlling the status light to emit at least one visible light with a specific color so as to exhibit a specific lighting scenario;

wherein in case of a work temperature of the wireless charging device measured by the temperature sensor is higher than the fan enabling temperature, the microcontroller enabling the radiator fan, and a fan rotation speed of the radiator fan being raised with an increase of the work temperature;

wherein after the work temperature of the wireless charging device measured by the temperature sensor is lower than the fan disabling temperature, the microcontroller disabling the radiator fan.

In one embodiment, the wireless charging device further comprises:

a first driver unit, being disposed in the base, and being coupled to the microcontroller and the radiator fan, so as to drive the radiator fan based on a first driving signal that is transmitted from the microcontroller; and a second driver unit, being disposed in the base, and being coupled to the microcontroller and the status light, so as to drive the status light based on a second driving signal that is transmitted from the microcontroller.

In one embodiment, the electrical connector, the microcontroller, the power modulating unit, the first driver unit, the second driver unit, and the temperature sensor are disposed on the circuit board 11.

In one embodiment, in case of the designated power being higher than or equal to the first reference power, the microcontroller enables the radiator fan by letting the first driver unit drive the radiator fan, and the fan rotation speed of the radiator fan is raised with an increase of the designated power.

In another one embodiment, in case of the designated power being lower than or equal to the second reference power, the first driver unit drives the radiator fan to lower the fan rotation speed of the radiator fan according to the second driving signal, and the fan rotation speed of the radiator fan is lowered with a decrease of the designated power.

In another one embodiment, in case of the designated power being lower than or equal to the third reference power, the microcontroller disables the radiator fan by stopping the first driver unit 16 driving the radiator fan.

In a practicable embodiment, the electrical connector is selected from the group consisting of USB electrical connector meeting a fast charge standard of USB power delivery (USB PD), type-C USB electrical connector and Thunderbolt 3 electrical connector.

In a practicable embodiment, the mobile electronic device or an electronic device stores the plurality of setting parameters into the memory unit of the microcontroller before the wireless charging device is enabled to wirelessly charge the mobile electronic device. In which, the mobile electronic device is selected from the group consisting of: mobile power bank, tablet computer, smartphone, smart watch, and charging box for wireless earbuds, and the electronic device is selected from the group consisting of desk computer and laptop computer.

In one embodiment, during a wireless charging operation of the wireless charging device, the electronic device supplies a DC power to the electrical connector via the electrical cable, and the microcontroller coupled to the electrical connector transmits a plurality of monitoring parameters to the electronic device via the electrical cable. In which, the plurality of monitoring parameters comprise the work temperature, a charging power, the fan rotation speed, and an execution time of the wireless charging operation.

In another one embodiment, a power supply device supplies a DC power to the electrical connector via the electrical cable, and the power supply device is selected from the group consisting of battery charger, power adapter, AC/DC converter, DC/DC converter, and high-capacity battery.

In one embodiment, the wireless charging device further comprises:

a charge mode choosing unit, being disposed in the base and coupled to the microcontroller;

a lighting scenario choosing unit, being disposed in the base and coupled to the microcontroller; and a radiator fan switch unit, being disposed in the base and coupled to the microcontroller.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a wireless charging device with functionality of charging power and charging speed adjustable disclosed by the present invention, embodiments of the present invention will be described in detail with reference to the attached drawings hereinafter.

Figure 1:
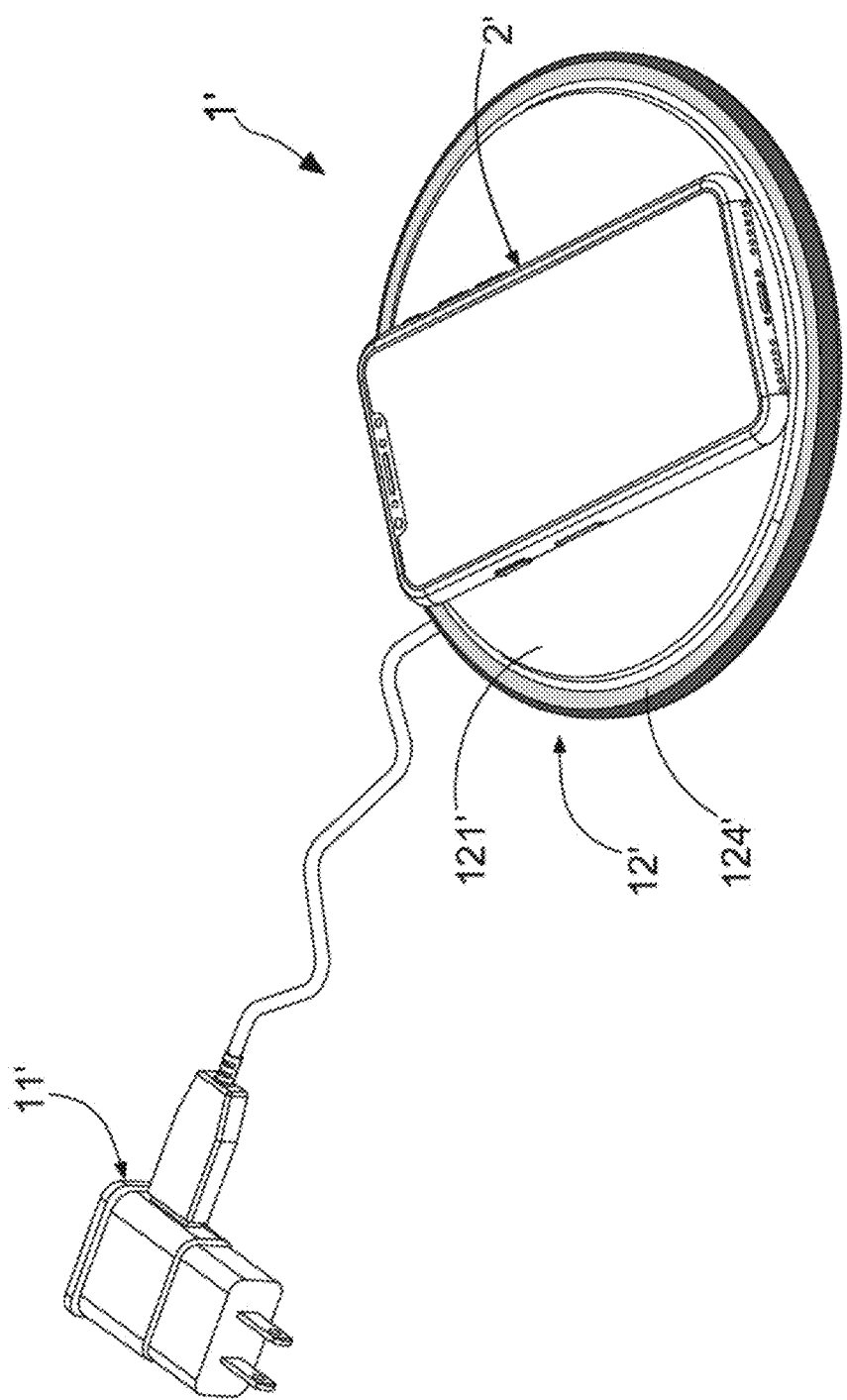
FIG. 1 shows a stereo diagram of a wireless charging device and a smartphone.
Figure 2:
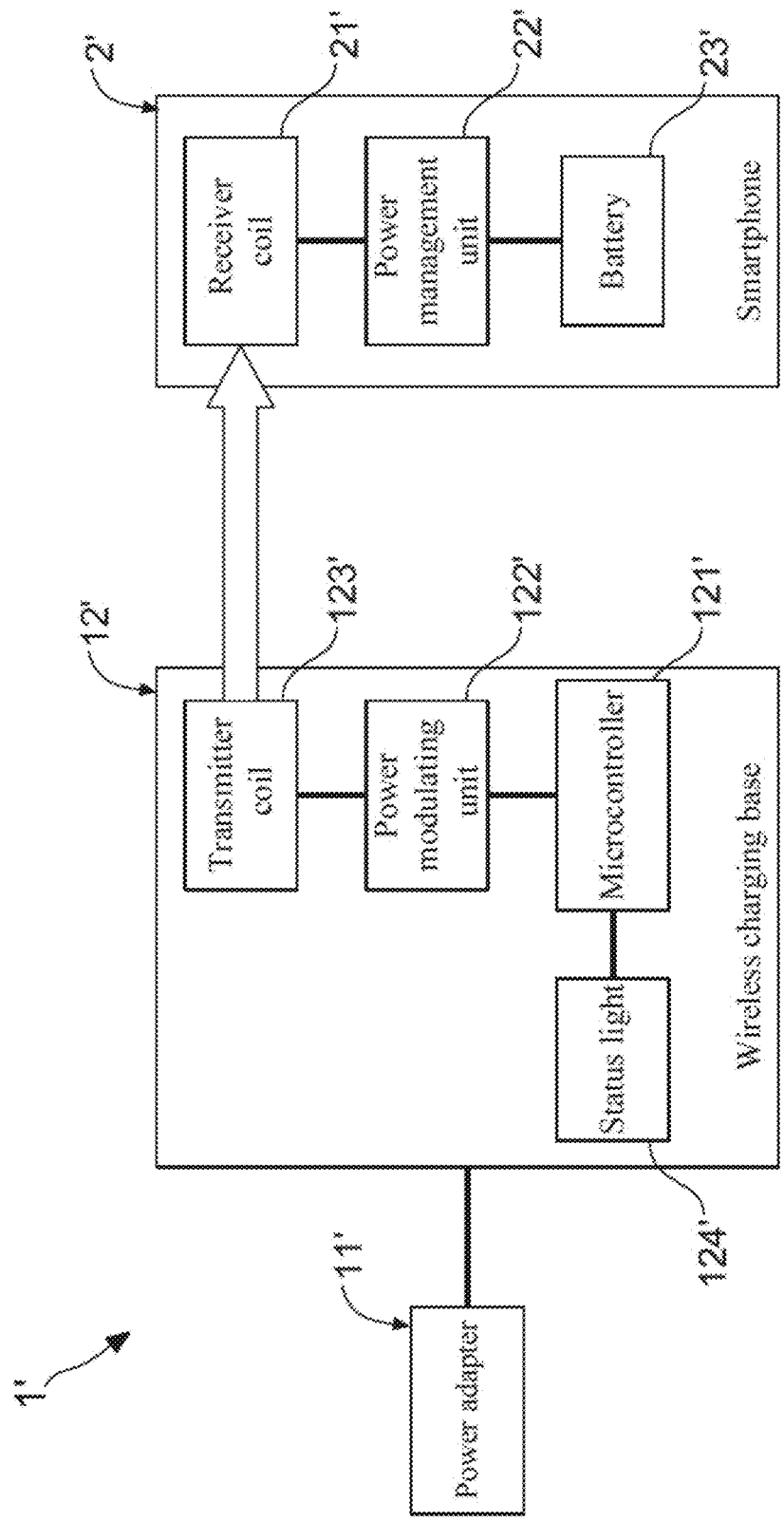
FIG. 2 shows a block diagram of the wireless charging device and the smartphone.
Figure 3:
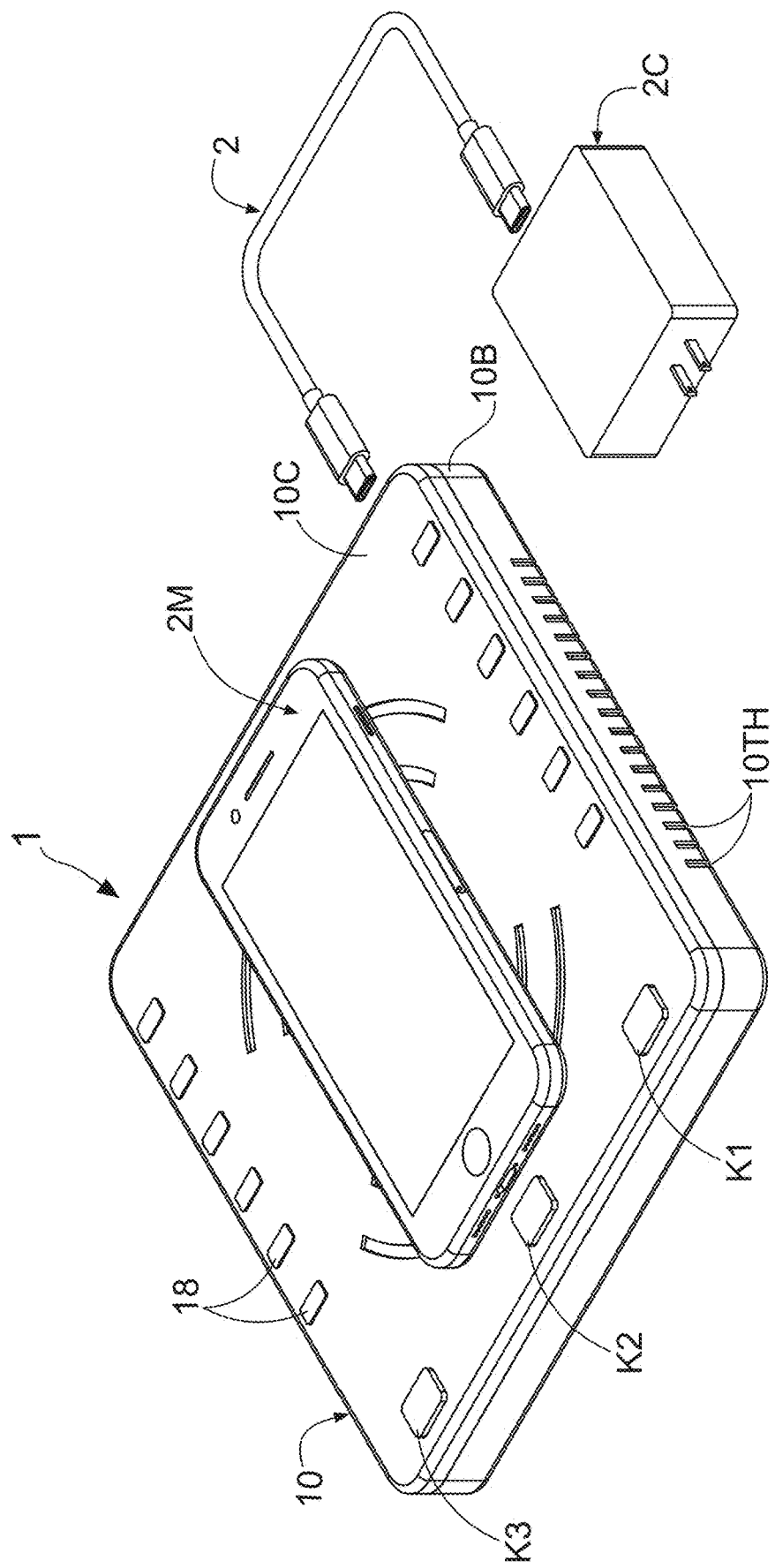
FIG. 3 shows a first stereo diagram of a wireless charging device with functionality of charging power and charging speed adjustable according to the present invention.
Figure 4:
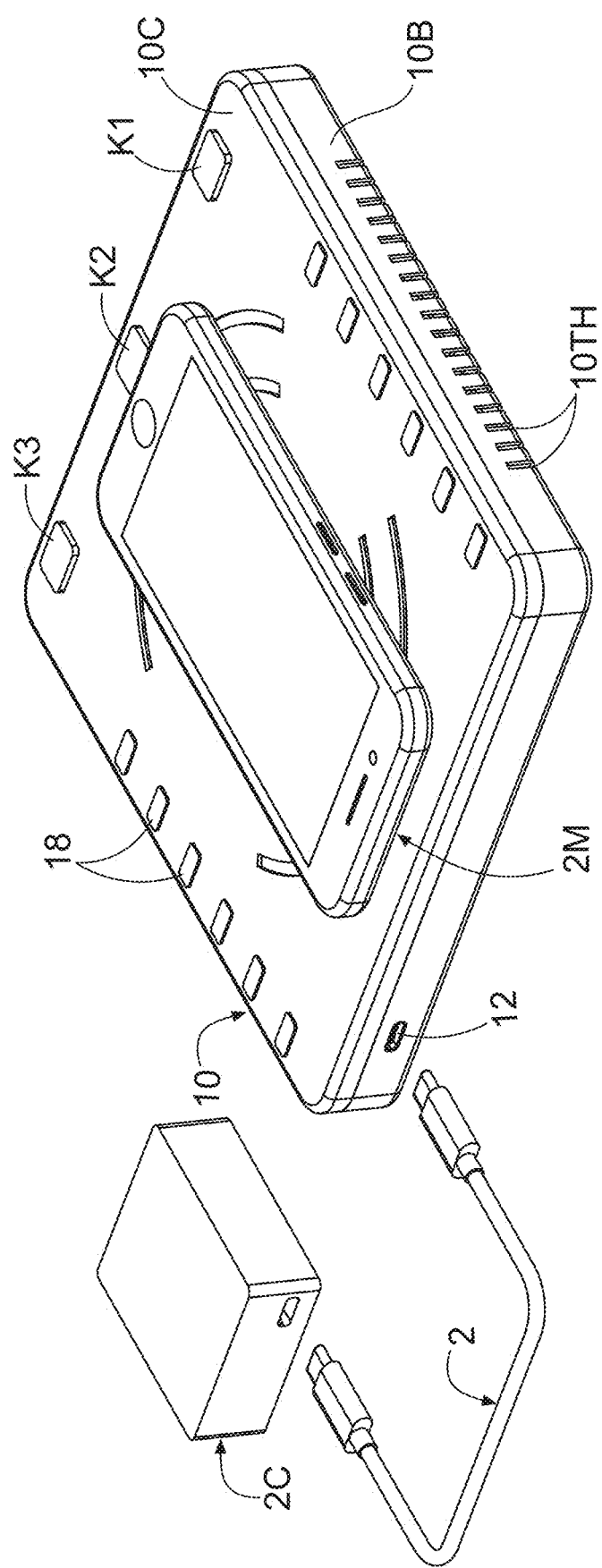
FIG. 4 shows a second stereo diagram of the wireless charging device with functionality of charging power and charging speed adjustable according to the present invention.
Figure 5:
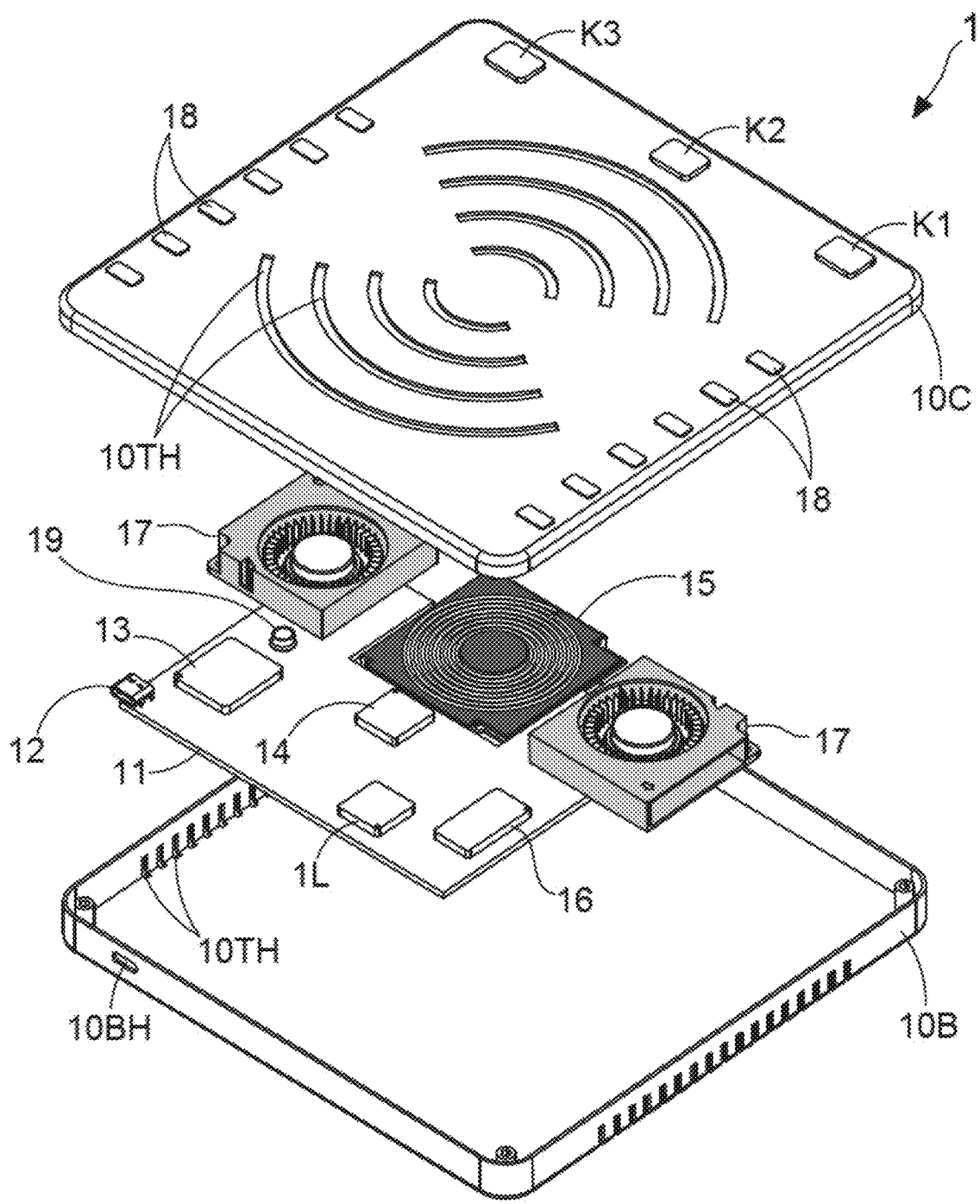
FIG. 5 shows an exploded view of the wireless charging device.

FIG. 3 shows a first stereo diagram of a wireless charging device with functionality of charging power and charging speed adjustable according to the present invention, and FIG. 4 shows a second stereo diagram of the wireless charging device with functionality of charging power and charging speed adjustable. Moreover, FIG. 5 shows an exploded view of the wireless charging device. As FIG. 3, FIG. 4 and FIG. 5 show, the wireless charging device 1 is for use in wirelessly charging a mobile electronic device 2M like a smartphone, a mobile power bank, a tablet computer, a smart watch, or a charging box for wireless earbuds. According to the present invention, the wireless charging device 1 comprises: a wireless charging base 10 consisting of a base 10B and a cover 10C, a circuit board 11, an electronic connector 12, a microcontroller 13, a power modulating unit 14, a transmitter coil 15, a first driver unit 16, at least one radiator fan 17, a second driver unit 1L, at least one status light 18, and a temperature sensor 19. In a practicable embodiment, the electrical connector 12 can be a USB electrical connector that meets a fast charge standard of USB power delivery (USB PD), a type-C USB electrical connector or a Thunderbolt 3 electrical connector. FIG. 5 also depicts that the circuit board 11 is disposed in the base 10B, and the electrical connector 12, the microcontroller 13, the power modulating unit 14, the first driver unit 16, the second driver unit 1L, and the temperature sensor 19 being disposed on the circuit board 11. As described in more detail below, the electrical connector 12 is exposed out of the base 10B via a through hole 10BH that is formed on one side of the base 10B, thereby being further connected to an external electrical cable 2.

Figure 6:
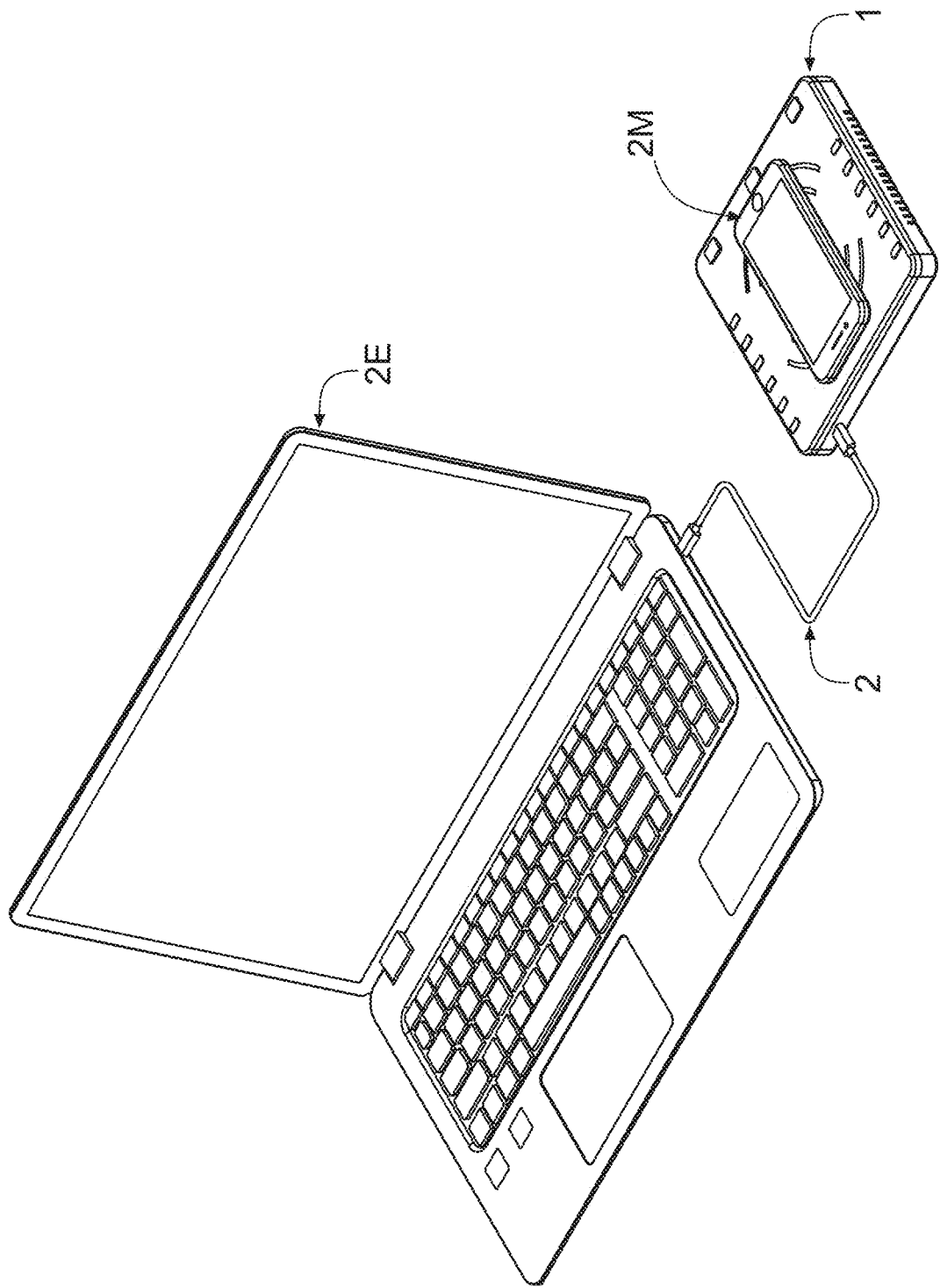
FIG. 6 shows a second stereo diagram of the wireless charging device and an electronic device.

FIG. 6 shows a second stereo diagram of the wireless charging device and an electronic device. In spite of the fact that FIG. 3 and FIG. 4 depicts that a power supply device 2C supplies a DC power to the electrical connector 12 via the electrical cable 2, that is not adopted for being a limitation of an electronic for supplies the DC power. For example, FIG. 6 depicts that the electrical connector 12 is coupled to an electronic device 2E through the electrical cable 2, such that the electronic device 2E supplies a DC power to the electrical connector 12 via the electrical cable 2. In a practicable embodiment, the electronic device 2E can be a power supply device, a battery charger, a power adapter, an AC/DC converter, a DC/DC converter, a high-capacity battery, a desk computer, or a laptop computer.

Figure 7:
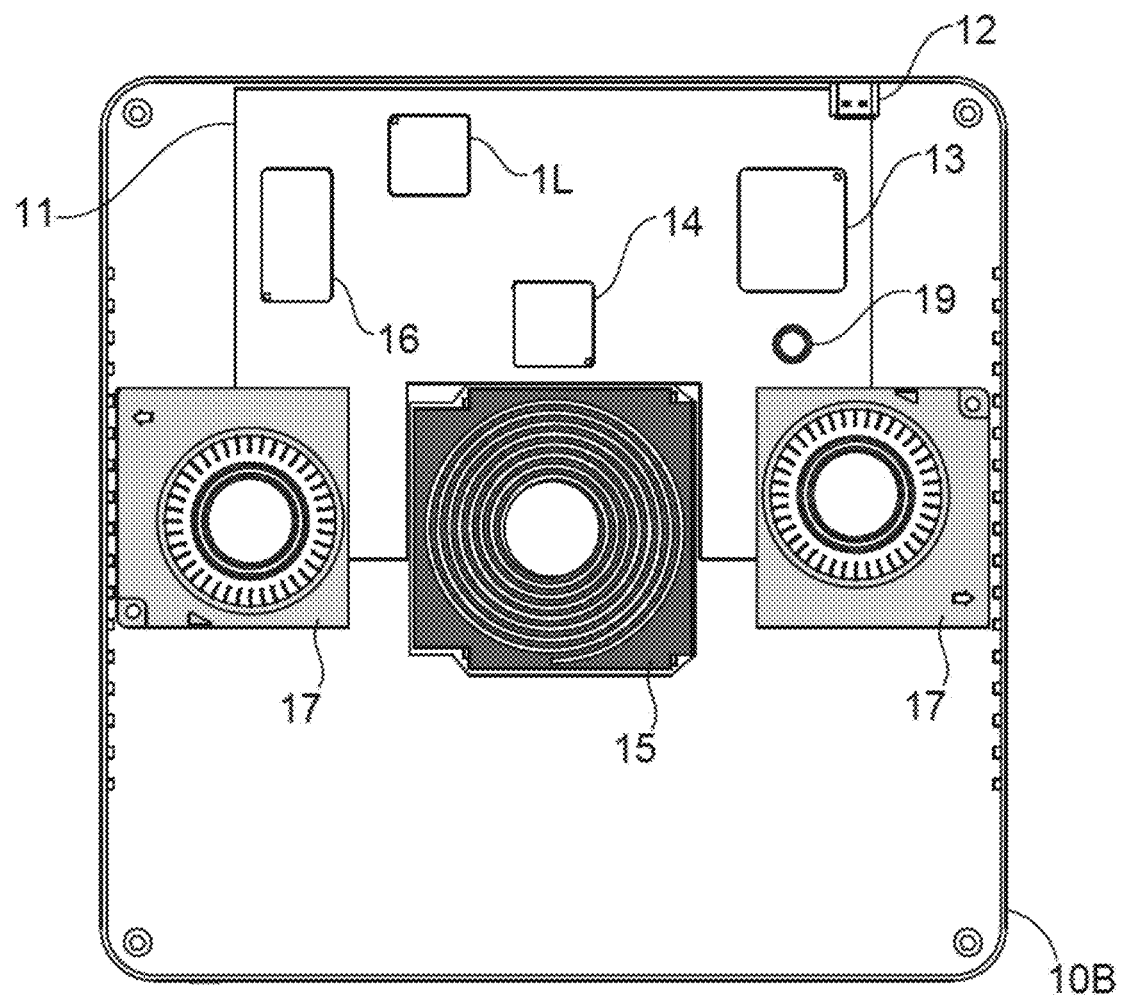
FIG. 7 shows a top view of a base, a circuit board, an electrical connector, a microcontroller, a power modulating unit, a transmitter coil, a first driver unit, two radiator fans, a second driver unit, several status lights, and a temperature sensor.
Figure 8:
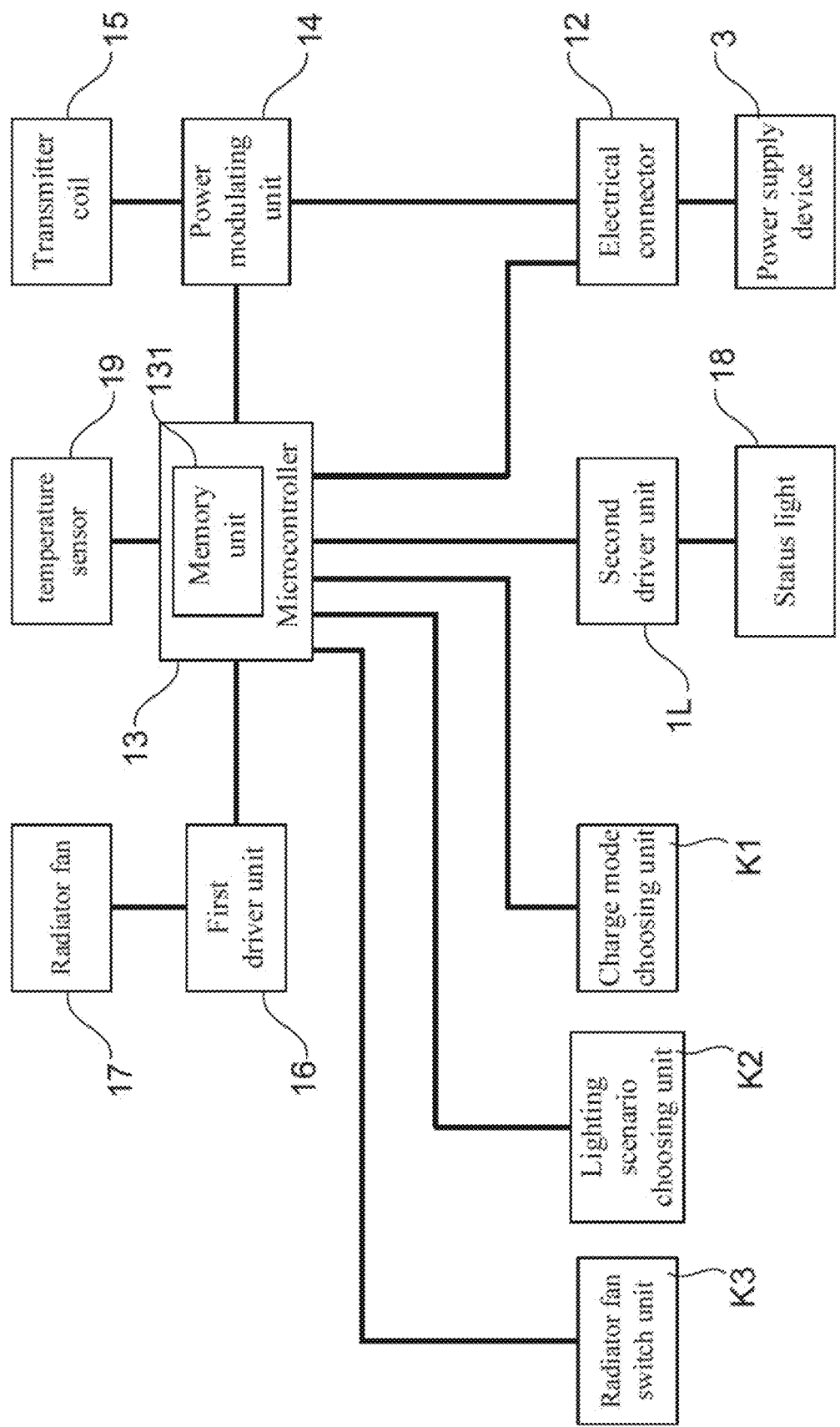
FIG. 8 shows a block diagram of the electrical connector, the microcontroller, the power modulating unit, the transmitter coil, the first driver unit, the radiator fan, the second driver unit, the status light, and the temperature sensor.

FIG. 7 shows a top view of the base 10B, the circuit board 11, the electrical connector 12, the microcontroller 13, the power modulating unit 14, the transmitter coil 15, the first driver unit 16, two radiator fans 17, the second driver unit 1L, several status lights 18, and the temperature sensor 19. Moreover, FIG. 8 shows a block diagram of the electrical connector 12, the microcontroller 12, the power modulating unit 14, the transmitter coil 15, the first driver unit 16, the radiator fan 17, the second driver unit 1L, the status light 18, and the temperature sensor 19. According to the present invention, the microcontroller 13 is disposed in the base 10B and coupled to the electrical connector 12, and the a power modulating unit 14 is disposed in the base 10B so as to be coupled to the electrical connector 12 and the microcontroller 13. It is worth noting that, there are several vent holes 10TH formed on the base 10B and/or the cover 10C of the wireless charging base 10. On the other hand, the two radiator fans 17 are disposed in the base 10B and coupled to the microcontroller 13. In which, the radiator fan 17 faces to the vent holes 10TH of the cover 10C by an air suction side thereof, and faces to the vent holes 10TH of the base 10B by an air discharging side thereof.

FIG. 4 and FIG. 8 depict that the status lights 18 are disposed in the base 10B and coupled to the microcontroller 13, and the status light 18 has a light emission portion that is exposed out of the base 10B via a through hole 10BH formed on one side of the base 10B. On the other hand, the temperature sensor 19 is disposed in the base 10B and coupled to the microcontroller 13. According to the present invention, the first driver unit 16 is disposed in the base 10B, and being coupled to the microcontroller 13 and the radiator fan 17, so as to drive the radiator fan 17 based on a first driving signal that is transmitted from the microcontroller 13. Moreover, the second driver unit 1L is disposed in the base 10B, and is coupled to the microcontroller 13 and the status light 18, so as to drive the status light 18 based on a second driving signal that is transmitted from the microcontroller 13.

Particularly, the microcontroller 13 has a memory unit 131 that stores with a plurality of setting parameters comprising a fan enabling temperature, a fan disabling temperature, a first reference power, a second reference power, a third reference power, a non-charge charge time period, a high-power charge time period, a regular-power charge time period, a low-power charge time period, and a plurality of lighting scenarios. Before enabling the wireless charging device 1 to wirelessly charge the mobile electronic device 2M, as FIG. 6 show, user is able to operate his mobile electronic device 2M or utilize an electronic device 2E to store the plurality of setting parameters into the memory unit 131 of the microcontroller 13. In a practicable embodiment, the mobile electronic device 2M can be operated to store the plurality of setting parameters into the memory unit 131 of the microcontroller 13 by using a near field communication (NFC) unit thereof.

After storing the setting parameters into the memory unit 131 of the microcontroller 13, the wireless charging device 1 is enabled to wirelessly charge the mobile electronic device 2M put on the wireless charging base 10. It is worth emphasizing that, in case of the wireless charging device 1 wirelessly charging the mobile electronic device 2M in the high-power charge time period, the regular-power charge time period or the low-power charge time period, the microcontroller 13 controls the power modulating unit 14 to produce a wireless charging signal with a designated power, thereby transmitting the wireless charging signal to a receiver coil of the mobile electronic device 2M through the transmitter coil 15. For example, the designated power may be 5 W, 7.5 W, 10 W, 15 W, 27 W, 30 W, and 40 W, in ascending order. In general, 40 W, 30 W and 27 W are classified to high power, 15 W and 20 W are classified to regular power, and 7.5 W and 5 W are classified to low power. By such arrangement, the transmitter coil 15 transmits the wireless charging signal with the designated power (40 W, 30 W or 27 W) to the receiver coil of the mobile electronic device 2M in a pre-set high-power charge time period like 15 minutes. Moreover, the transmitter coil 15 transmits the wireless charging signal with the designated power (20 W or 15 W) to the receiver coil of the mobile electronic device 2M in a pre-set regular-power charge time period like 10 minutes. On the other hand, the transmitter coil 15 transmits the wireless charging signal with the designated power (7.5 W or 5 W) to the receiver coil of the mobile electronic device 2M in a pre-set low-power charge time period like 5 minutes.

It should be understood that, in the high-power charge time period, the wireless charging device 1 wirelessly charges the mobile electronic device 2M by using quick charge technique, and there is heat produced in the wireless charging base 10 or the mobile electronic device 2M. In such case, once the temperature sensor 19 measured that a work temperature of the wireless charging base 10 is higher than the fan enabling temperature (i.e., one of the forgoing setting parameters), the microcontroller 13 enables the radiator fan 17, and controls a fan rotation speed of the radiator fan 17 to be raised with an increase of the work temperature. As described in more detail below, in case of the work temperature being higher than or equal to the fan enabling temperature, the microcontroller 13 enables the radiator fan 17 by letting the first driver unit 16 drive the radiator fan 17.

After a battery of the mobile electronic device 2M is quick wirelessly charged by the wireless charging device 1 to have a battery power user acceptable (e.g., 80 percent), the microcontroller 13 controls the power modulating unit 14 to change the designated power of the wireless charging signal to regular power or low power, thereby transmitting the wireless charging signal with the designated power to the receiver coil of the mobile electronic device 2M through the transmitter coil 15. It can be deduced that, the work temperature of the wireless charging base 10 operated in the high-power charge time period certainly lower than that of the wireless charging base 10 operated in the low-power charge time period. In low-power charge time period, the microcontroller 13 disables the radiator fan 17 in case of the work temperature being lower than or equal to the fan disabling temperature (i.e., one of the forgoing setting parameters). As described in more detail below, in case of the work temperature being lower than or equal to the fan disabling temperature, the microcontroller 13 disables the radiator fan 17 by stopping the first driver unit 16 driving the radiator fan 17.

Briefly speaking, according to the present invention, the microcontroller 13 has a memory unit 131 that stores with a plurality of setting parameters, such that the microcontroller 13 controls the wireless charging module to produce a wireless charging signal with a specific power according to the setting parameters, thereby transmitting the wireless charging signal to a receiver coil of the mobile electronic device 2M. Moreover, according to the setting parameters, the microcontroller 13 carries out a controlling operation of the radiator fan 17, such as fan rotation starting, rotation speed raising, rotation speed lowering, and fan rotation stopping. Thus, in case of the designated power being higher than or equal to the first reference power (i.e., one of the forgoing setting parameters), the microcontroller 13 enabling the radiator fan 17 by letting the first driver unit 16 drive the radiator fan 17, and the fan rotation speed of the radiator fan 17 is raised with an increase of the designated power. Moreover, in case of the designated power being lower than or equal to the second reference power, the first driver unit 16 is controlled to drive the radiator fan 17 to lower the fan rotation speed of the radiator fan 17 according to the second driving signal, and the fan rotation speed of the radiator fan 17 is lowered with a decrease of the designated power. Furthermore, in case of the designated power being lower than or equal to the third reference power, the microcontroller 13 disables the radiator fan 17 by stopping the first driver unit 16 driving the radiator fan 17.

Please refer to FIG. 5, FIG. 7 and FIG. 8. According to the present invention, when the wireless charging device 1 is operated in the high-power charge time period, the regular-power charge time period or the low-power charge time period, the microcontroller 13 controls the second driver unit 1L to drive the status light 18 to emit at least one visible light with a specific color for showing a specific lighting scenario. For example, the status light 18 shows a lighting scenario of a rainbow-colored light stream with high speed moving in the pre-set high-power charge time period like 15 minutes. Moreover, the status light 18 shows a lighting scenario of a rainbow-colored light stream with regular speed moving in the pre-set regular-power charge time period like 10 minutes. On the other hand, the status light 18 shows a lighting scenario of a rainbow-colored light stream with slow speed moving in the pre-set low-power charge time period like 5 minutes. Eventually, the status light 18 shows a lighting scenario of a static rainbow-colored light stream after the battery of the mobile electronic device 2M is wirelessly charged to have 100 percent battery power.

Furthermore, according to the setting parameters, the microcontroller 13 can also control the status lights 18 to emit at least one visible light with a specific color so as to exhibit a specific lighting scenario, in order to indicating that the a failure of the wireless charging operation of the wireless charging base 10. Of course, the status lights 18 cannot only exhibit lighting scenarios for indicating that the battery is in a full charge state or a charged state, and but also show lighting scenarios for indicating that an enabled state and a standby state of the wireless charging base 10.

FIG. 6 also depicts that, the electronic device 2E supplies a DC power to the electrical connector 12 via the electrical cable 2, and the microcontroller 13 coupled to the electrical connector 12 transmits a plurality of monitoring parameters to the electronic device 2E via the electrical cable 2. In other words, it is able to installed a specific application program in an operating system (OS) of the electronic device 2E like a laptop computer, such that it is easy for user to edit and store the plurality of setting parameters into the memory unit 131 of the microcontroller 13 before the wireless charging device 1 is enabled to wirelessly charge the mobile electronic device. Moreover, through the application program, the user is facilitated to acquire a plurality of monitoring parameters of the wireless charging device 1 that is executing the wireless charging operation. In one embodiment, the monitoring parameters comprise the work temperature, the fan rotation speed, an execution time of the wireless charging operation, and a charging power (i.e., the designated power of the wireless charging signal).

FIG. 5, FIG. 7 and FIG. 8 further depict that the wireless charging device 1 of the present invention further comprises a charge mode choosing unit K1, a lighting scenario choosing unit K2 and a radiator fan switch unit K3. In which, the charge mode choosing unit K1 is disposed in the base 10B and coupled to the microcontroller 13, and comprises at least one pressing button that is exposed out of the base 10B. Moreover, the lighting scenario choosing unit K2 is disposed in the base 10B and coupled to the microcontroller 13, and comprises at least one pressing button that is exposed out of the base 10B. On the other hand, the radiator fan switch unit K3 is disposed in the base 10B and coupled to the microcontroller 13, and comprises at least one pressing button that is exposed out of the base 10B. By such arrangement, user is able to press the charge mode choosing unit K1 to make the wireless charging device 1 be operated in a high-power charge mode, a regular-power charge mode or a low-power charge mode. Moreover, user can also press the lighting scenario choosing unit K2 to switch the lighting scenario exhibited by the status lights 18. One the other hand, user can also press the radiator fan switch unit K2 so as to manually switch the rotation speed of the radiator fan 17, enable the radiator fan 17, raise rotation speed, lower rotation speed, or disable the radiator fan 17.

Therefore, through above descriptions, all embodiments and their constituting elements of the wireless charging device with functionality of charging power and charging speed adjustable disclosed by the present invention; in summary, the present invention includes the advantages of:

(1) The present invention discloses a wireless charging device 1 for use in wirelessly charging a mobile electronic device 2M. The wireless charging device 1 comprises a microcontroller 13, a wireless charging module comprising a power modulating unit 14 and a transmitter coil 15, at least one radiator fan 17, at least one status light 18, and a temperature sensor 19. The microcontroller 13 has a memory unit 131 that stores with a plurality of setting parameters, such that the microcontroller 13 controls the wireless charging module to produce a wireless charging signal with a specific power according to the setting parameters, thereby transmitting the wireless charging signal to a receiver coil of the mobile electronic device 2M. Moreover, according to the setting parameters, the microcontroller 13 carries out a controlling operation of the radiator fan 17, such as fan rotation starting, rotation speed raising, rotation speed lowering, and fan rotation stopping. In addition, the microcontroller 13 also controls the status light 18 to exhibits a corresponding lighting scenario according to the setting parameters and an immediate charging mode.

The above description is made on embodiments of the present invention. However, the embodiments are not intended to limit scope of the present invention, and all equivalent implementations or alterations within the spirit of the present invention still fall within the scope of the present invention.

What is claimed is:

1. A wireless charging device, comprising:
    a wireless charging base, comprising a base and a cover;
    an electrical connector, being disposed in the base, and being exposed out of the base via a through hole that is formed on one side of the base, thereby being further connected to an external electrical cable;
    a microcontroller, being disposed in the base and coupled to the electrical connector;
    a power modulating unit, being disposed in the base, and being coupled to the electrical connector and the microcontroller;
    a transmitter coil, being disposed in the base and coupled to the power modulating unit;
    at least one radiator fan, being disposed in the base and coupled to the microcontroller;
    at least one status light, being disposed in the base and coupled to the microcontroller, wherein the status light has a light emission portion that is exposed out of the base via a through hole formed on one side of the base; and
    a temperature sensor, being disposed in the base and coupled to the microcontroller;
    wherein the microcontroller has a memory unit that stores with a plurality of setting parameters comprising a fan enabling temperature, a fan disabling temperature, a first reference power, a second reference power, a third reference power, a non-charge charge time period, a high-power charge time period, a regular-power charge time period, a low-power charge time period, and a plurality of lighting scenarios;
    wherein in case of the wireless charging device being enabled to wirelessly charge a mobile electronic device in the high-power charge time period, the regular-power charge time period or the low-power charge time period, the microcontroller controlling the power modulating unit to produce a wireless charging signal with a designated power, thereby transmitting the wireless charging signal to a receiver coil of the mobile electronic device through the transmitter coil;
    wherein when the wireless charging device is operated in the high-power charge time period, the regular-power charge time period or the low-power charge time period, the microcontroller controlling the status light to emit at least one visible light with a specific color so as to exhibit a specific lighting scenario;
    wherein in case of a work temperature of the wireless charging device measured by the temperature sensor is higher than the fan enabling temperature, the microcontroller enabling the radiator fan, and a fan rotation speed of the radiator fan being raised with an increase of the work temperature;
    wherein after the work temperature of the wireless charging device measured by the temperature sensor is lower than the fan disabling temperature, the microcontroller disabling the radiator fan.

2. The wireless charging device of claim 1, further comprising:
    a first driver unit, being disposed in the base, and being coupled to the microcontroller and the radiator fan, so as to drive the radiator fan based on a first driving signal that is transmitted from the microcontroller; and
    a second driver unit, being disposed in the base, and being coupled to the microcontroller and the status light, so as to drive the status light based on a second driving signal that is transmitted from the microcontroller.

3. The wireless charging device of claim 2, further comprising a circuit board that is disposed in the base, and the electrical connector, the microcontroller, the power modulating unit, the first driver unit, the second driver unit, and the temperature sensor being disposed on the circuit board.

4. The wireless charging device of claim 2, in case of the designated power being higher than or equal to the first reference power, the microcontroller enabling the radiator fan by letting the first driver unit drive the radiator fan, and the fan rotation speed of the radiator fan being raised with an increase of the designated power.

5. The wireless charging device of claim 2, in case of the designated power being lower than or equal to the second reference power, the first driver unit driving the radiator fan to lower the fan rotation speed of the radiator fan according to the second driving signal, and the fan rotation speed of the radiator fan being lowered with a decrease of the designated power.

6. The wireless charging device of claim 2, in case of the designated power being lower than or equal to the third reference power, the microcontroller disabling the radiator fan by stopping the first driver unit driving the radiator fan.

7. The wireless charging device of claim 1, wherein the electrical connector is selected from the group consisting of USB electrical connector meeting a fast charge standard of USB power delivery (USB PD), type-C USB electrical connector and Thunderbolt 3 electrical connector.

8. The wireless charging device of claim 1, wherein there are a plurality of vent holes formed on the base and/or the cover of the wireless charging base.

9. The wireless charging device of claim 1, wherein the mobile electronic device or an electronic device stores the plurality of setting parameters into the memory unit of the microcontroller before the wireless charging device is enabled to wirelessly charge the mobile electronic device.

10. The wireless charging device of claim 1, wherein the mobile electronic device stores the plurality of setting parameters into the memory unit of the microcontroller by using a near field communication (NFC) unit thereof.

11. The wireless charging device of claim 9, wherein the mobile electronic device is selected from the group consisting of: mobile power bank, tablet computer, smartphone, smart watch, and charging box for wireless earbuds.

12. The wireless charging device of claim 9, wherein during a wireless charging operation of the wireless charging device, the electronic device supplying a DC power to the electrical connector via the electrical cable, and the microcontroller coupled to the electrical connector transmitting a plurality of monitoring parameters to the electronic device via the electrical cable.

13. The wireless charging device of claim 12, wherein the electronic device is selected from the group consisting of desk computer and laptop computer.

14. The wireless charging device of claim 9, wherein a power supply device supplies a DC power to the electrical connector via the electrical cable, and the power supply device is selected from the group consisting of battery charger, power adapter, AC/DC converter, DC/DC converter, and high-capacity battery.

15. The wireless charging device of claim 12, wherein the plurality of monitoring parameters comprise the work temperature, a charging power, the fan rotation speed, and an execution time of the wireless charging operation.

16. The wireless charging device of claim 1, further comprising:
a charge mode choosing unit, being disposed in the base and coupled to the microcontroller;
a lighting scenario choosing unit, being disposed in the base and coupled to the microcontroller; and
a radiator fan switch unit, being disposed in the base and coupled to the microcontroller.

17. The wireless charging device of claim 16, wherein the charge mode choosing unit comprises at least one pressing button that is exposed out of the base.

18. The wireless charging device of claim 16, wherein the lighting scenario choosing unit comprises at least one pressing button that is exposed out of the base.

19. The wireless charging device of claim 16, wherein the radiator fan switch unit comprises at least one pressing button that is exposed out of the base.

* * * * *